No. 796,041. PATENTED AUG. 1, 1905.
T. DUNCAN.
ELECTRIC METER.
APPLICATION FILED JULY 11, 1901. RENEWED JAN. 7, 1905.
2 SHEETS—SHEET 1.
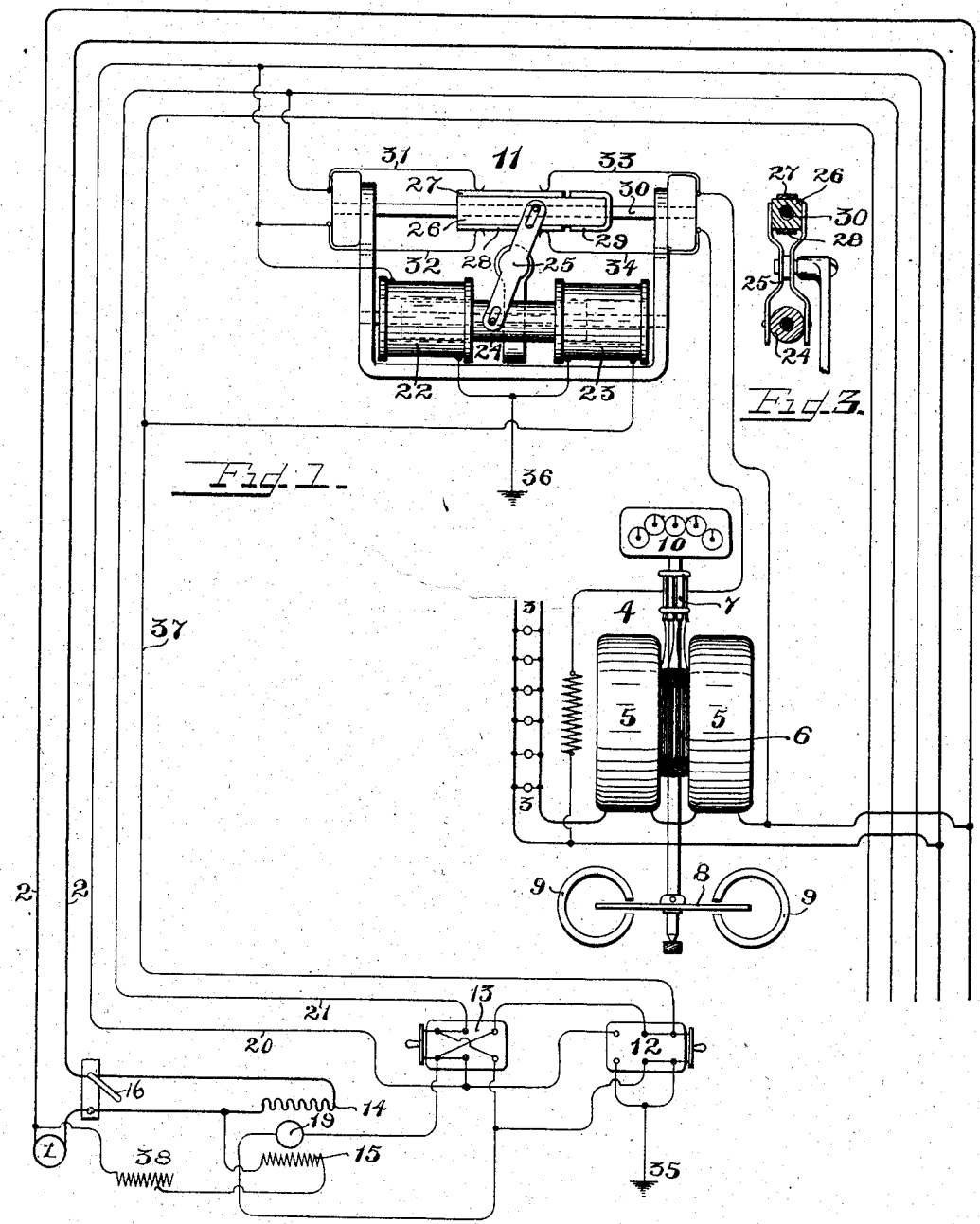

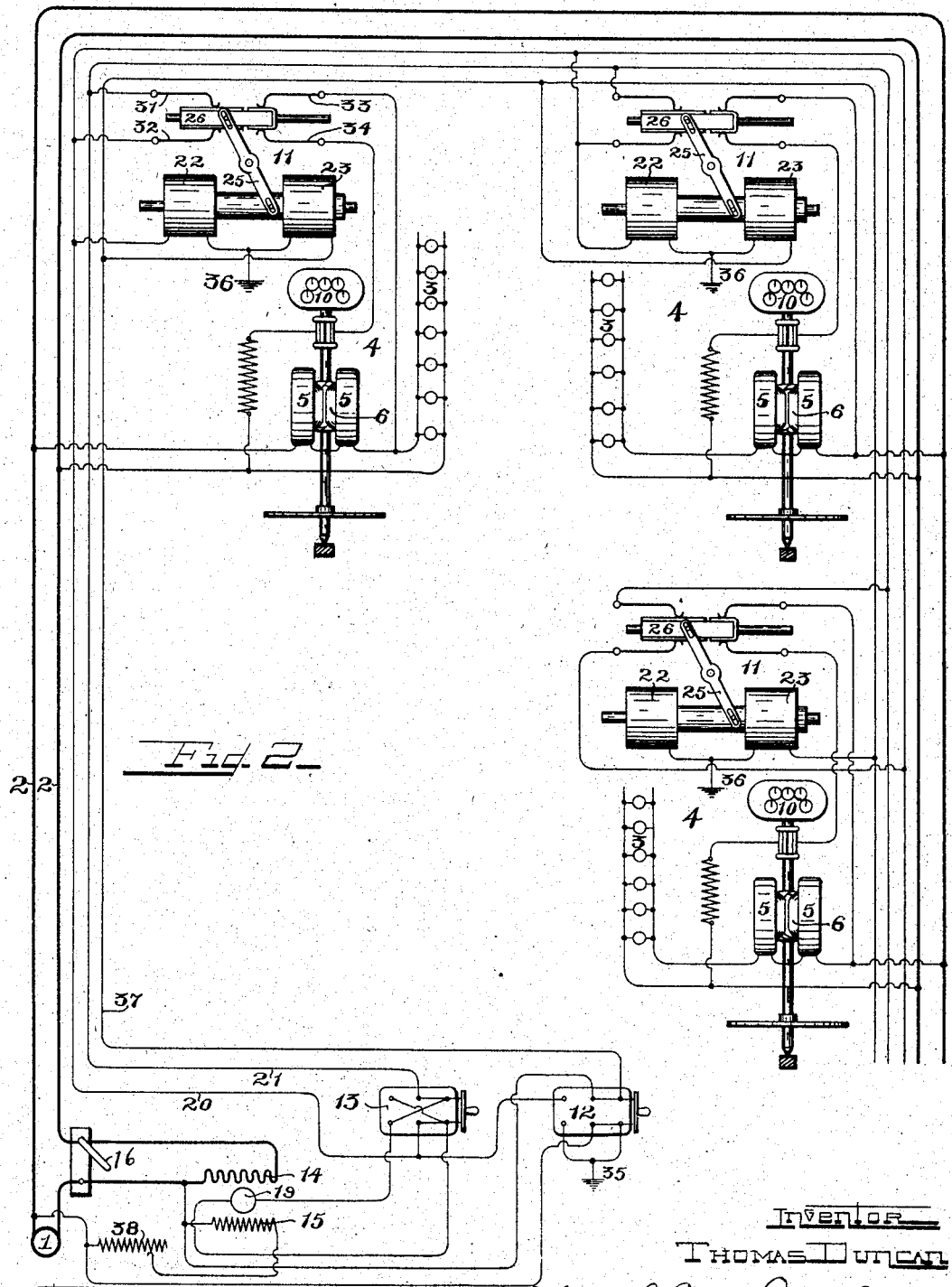

UNITED STATES PATENT OFFICE.

THOMAS DUNCAN, OF CHICAGO, ILLINOIS.

ELECTRIC METER.

No. 796,041. Specification of Letters Patent. Patented Aug. 1, 1905.

Application filed July 11, 1901. Renewed January 7, 1905. Serial No. 239,968.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to multirate meters, and has for its object the provision of an improved form of meter whose rate of operation per unit of load or energy may be automatically varied upon predetermined change in the current supplied to the system.

In the metering of energy or loads in working circuits it is desired to provide for three different rates of operation of the counting mechanism of the meters per unit of load or energy, one rate of operation, the normal, continuing, say, from six to six in the day-time; another rate of operation, the over rate—that is, above the normal—continuing from six in the evening to twelve midnight; another rate of operation, the under rate—that is, below the normal—continuing from twelve at midnight to six in the morning. The reason for this is that the central station is usually taxed to its utmost between the hours of six and twelve at night, for which, consequently, the consumer who uses power during this time should be charged at a rate in proportion to the cost of the central-station installation, which is equipped for this maximum output required at no other time. Between twelve and six in the morning the station is taxed the least, during which time a minimum amount of apparatus is required, calling for the minimum return upon the investment. Between the hours of six to six in the day-time the central station is not taxed to its limit, nor is it taxed at the minimum, so that the consumer should be charged a rate warranted by the installation necessary to supply the normal demand. Obviously these periods, during which the normal, maximum, and minimum rates of operation of the measuring mechanism per units of load or energy, as required, may vary with the season.

In practicing my present invention I employ electromagnetic means in the form of a separately-excited generator, which serves to impress upon the pressure-winding of each meter a pressure varying with the load upon the system. The supplemental pressure-generator has two fields, one of which varies in proportion to the current in the system, this field-winding being preferably in series with one of the distributing-mains, while the other field-winding is in shunt of the distributing-mains. The armature of the generator is connected in circuit with the secondary-pressure circuit, which may be included in circuit with the pressure-winding of the meter, means being employed for adding the pressure of the secondary generator to the pressure, including the armature when the meter is to run at an over rate or for causing this secondary pressure to act as counter electromotive force when the meter is to run at an under rate, means being also provided whereby the secondary-pressure circuit may be removed from circuit with the pressure-winding of the meter to permit the same to run at a normal rate.

In the drawings, Figures 1 and 2 illustrate systems of electrical distribution with meters and controlling means of my invention associated therewith. Fig. 3 is a detail view of the means for controlling the association of the meter pressure-winding with the secondary-pressure circuit.

Like parts are indicated by similar characters of reference throughout the figures.

In each of the Figs. 1 and 2 is illustrated a generator 1, supplying current over the transmission-mains 2 2 to the translating devices 3 3. Consumers' meters 4 may be located wherever a center of consumption is located—that is, these meters are provided for each customer. Each meter 4 is in this instance illustrated in the form of a commutated motor-meter having its current-winding subdivided into current-coils 5 5 and its pressure-winding in the form of an armature 6, mounted upon a shaft upon which is located the commutator 7, that serves to connect the pressure or armature winding in circuit, which meter may also be provided with the usual damping-disk 8, arranged within the fields of damping-magnets 9 9. Meters of other construction, however, may be employed, and I do not, therefore, wish to be limited to a commutated motor-meter, nor do I wish to be limited to the character of current used in the system of distribution. Counting-trains 10 are illustrated to totalize the measurements of the load.

To effect a change in the rate of operation of the meter per unit of load or energy, I prefer to provide automatically-operated electromagnetic devices 11, that serve to change the field due to the pressure-winding of each meter, three adjustments being preferably provided—one where the pressure-winding produces a field of intermediate strength for the normal operation of the meter, (which may occur, for example, between the hours of six and six in the day-time,) another for an over-rate operation of the meter where the pressure-field is stronger—as, for example, between the hours of six and twelve at night—and the third where the pressure-field is at its weakest, to operate the meter at a minimum or under rate—as, for example, between the hours of twelve and six in the morning. Each adjusting device is designed by its operation to permit of the normal operation of the meter when the adjusting device is in one condition of operation and to permit of the excess-rate and under-rate operation of the meter when it is in another condition of operation. I will describe an adjusting or changing device 11 hereinafter, after first having described some of the apparatus at the central station to be used in coöperation therewith.

At the central station are provided switches 12 and 13 and a generator having one of its field-windings 14 directly influenced by the current in the system, this current-winding being preferably in series with one of the distributing-mains. The remaining field-winding 15 produces a field in proportion to the pressure impressed upon the system. As the current in the system varies the field due to the winding 14 will vary to cause a corresponding variation in the pressure of the auxiliary pressure-generator, this pressure increasing upon an increase in current in the distributing-mains and decreasing upon a decrease in current in the distributing-mains. The armature 19 of the generator is connected with the switch 13, which, according to its position, may serve to supply current to the armature 6 of each meter to furnish an additive electromotive force or a counter electromotive force.

For the purpose of including the armature 19 in circuit with the meter-armature 6 supplemental pressure-conductors 20 and 21 may be employed, which, through the agency of the controlling device 11, are either included in circuit with or excluded from the circuit including the armature 6. By means of the pole-changing switch 13 the connection of the armature 19 with the pressure-conductors 20 and 21 may be reversed, so that the pressure in the armature-winding 6 may be increased when the meter is to run at an over rate, or a counterelectromotive force may be impressed upon the armature 6 to decrease the field thereof to cause the meter to run at an under rate. If the meter is to run at a normal rate, the supplemental pressure-conductors 20 and 21 are preferably cut out of circuit with the armature 6 by the operation of the changer 11, as will be presently specified.

In the preferred form of the circuit-changer electromagnets in the form of solenoids 22 and 23 are employed, which have a common core 24, with which one end of the centrally-pivoted oscillating switch-actuating lever 25 is engaged. The other end of the switch-actuating lever is engaged with the insulating-mounting 26, upon which are mounted switch-plates 27, 28, and 29, the support 26 being movable longitudinally upon a guiding-rod 30, that passes through the same. Contact-springs 31 and 32 are connected with the supplemental pressure-conductors 20 and 21, while contact-springs 33 and 34 constitute the terminals of the armature or pressure winding 6. When the changer 11 is in the position illustrated in Fig. 1, the springs 32 34 and 31 33 are connected by means of the plates 27 and 28, whereby the supplemental pressure-conductors 20 and 21 are included in circuit with the armature, so that the armature may be subject to an additive electromotive force to increase its rate of operation—as, for example, between the hours of six and twelve at night—or the armature may be subject to a counterelectromotive force to decrease its rate of operation—as, for example, between the hours of twelve and six in the morning. If the meter is to run at a normal rate, the changers are placed in the positions illustrated in Fig. 2, where the supplemental conductors 20 and 21 are cut out of circuit, the terminal springs 33 and 34 being directly connected by the switch portion 29, in which condition the armature 6 is subject only to the pressure between the mains. For controlling the operation of the solenoids of the changers the switch 12 is employed. When either one of the switches 12 or 13 is to be employed, the other switch should be open. Thus in Fig. 1 the switch 13 being open the switch 12 is closed to the left. This closes circuit through the armature 19, to ground 35, to ground 36, through the solenoid 22, through the conductor 20, through one of the blades of the switch 12, through the cross connection of the pole-changing switch 13 back to the armature 19. The switch 12 being then open, the switch 13 will be operated either to the left or to the right, thereby causing an accelerating or a retarding electromotive force to be applied to the meter-armature 6. To cut the armature 6 out of the supplemental circuit, the switch 13 being open, the switch 12 is closed to the right, thereby causing current to flow through the solenoid 23, the circuit being as follows: from the armature 19, through one blade of the switch 12, to the ground 35, to ground 36, to solenoid 23, to conductor 37, to the other blade of the switch 12, through the cross connection of switch 13, back to the armature 19. When the changer 11 is in this position, it is desirable that both switches 12 and 13 be open; but switch 12 being open the closure of the switch 13 can cause no supplemental electromotive force to be impressed upon the armature 6, as there are no connections between the supplemental generator and the armature. When the supplemental conductors 20 and 21 are included in circuit with the armature 6, the counter electromotive force or the additive electromotive force impressed upon the armature, according to the position of the switch 13, is automatically varied by the separately-excited generator, the pressure created by this generator increasing upon an increase in current in the distributing-mains and decreasing upon a decrease of the current in the distributing-mains. Thus as the load upon the system increases the supplemental electromotive force is increased, which causes an increased operation of the meter or a decreased operation thereof, according to the adjustment of the switch 13. A switch 16 may be employed to cut the current field-winding of the pressure-generator out of circuit when desired. When normal rate is required, the switch 13 is preferably on open circuit.

In changing the meter from a normal-rate to an over-rate or under-rate instrument the switch 13 should be opened. The switch 12 is then thrown to the left and operated a number of times to insure the connection of the armature or pressure winding with the supplemental pressure-conductors 20 and 21. The switch 12 being then open, the switch 13 is thrown to the right, which may, for example, cause the meter to run at an over rate, or the switch 13 is thrown to the left if the meter is to run at an under rate. In changing the meters to instruments operating at normal rates the switch 12 is thrown to the right and opened and closed several times to insure an engagement between the switch parts 29 with the springs 33 and 34 of each changer.

The central-station arrangement shown in Fig 2 is similar to that shown in Fig. 1, except that the current controlled by switch 12 for the purpose of energizing the solenoids of the changers is derived from the main generator 1 instead of from the armature of the supplemental generator 19.

To compensate for the removal and inclusion of meters, an adjustable resistance 38 may be employed in series with the pressure field-winding of the auxiliary pressure-generator. In Figs. 2 and 3 the solenoids 22 and 23 may be operated by a current from the mains.

While I have herein shown and particularly described the preferred embodiment of my invention, I do not wish to be limited to the precise embodiment thereof herein set forth, as it is obvious that changes may readily be made without departing from the spirit thereof; but,

Having thus described my invention, I claim as new and desire to secure by Letters Patent—

1. In a system of electrical distribution, the combination with a current-generator, of a meter having current and pressure field-windings located at a district of consumption, a supplemental generator of pressure having a current field-winding producing a field varying with the current in the system, and means for impressing pressure due to the said pressure-generator upon the pressure-winding of the meter, substantially as described.

2. In a system of electrical distribution, the combination with a current-generator, of a meter having current and pressure-field windings located at a district of consumption, a supplemental generator of pressure having a current field-winding producing a field varying with the current in the system and a pressure field-winding producing a field proportional to the impressed pressure of the system, and means for impressing the pressure due to the said pressure-generator upon the pressure-winding of the meter, substantially as described.

3. In a system of electrical distribution, the combination with a current-generator, of a meter having current and pressure field-windings located at a district of consumption, a supplemental generator of pressure having a current field-winding producing a field varying with the current in the system, and means for impressing the pressure upon the pressure field-winding to add to the effect thereof, or to oppose the pressure in the pressure field-winding, substantially as described.

4. In a system of electrical distribution, the combination with a current-generator, of a meter having current and pressure field-windings located at a district of consumption, a supplemental generator of pressure having a current field-winding producing a field varying with the current in the system and a pressure field-winding producing a field proportional to the impressed pressure of the system, and means for impressing the pressure upon the pressure field-winding to add to the effect thereof, or to oppose the pressure in the pressure field-winding, substantially as described.

5. In a system of electrical distribution, the combination with a current-generator, of a meter having current and pressure field-windings located at a district of consumption, a supplemental generator of pressure having a current field-winding producing a field varying with the current in the system, means for impressing pressure due to the said pressure-generator upon the pressure-winding of the meter, and means for disconnecting the pressure-winding of the meter from the pressure-generator to cause the meter to run at a normal rate, substantially as described.

6. In a system of electrical distribution, the combination with a current-generator, of a meter having current and pressure field-windings located at a district of consumption, a supplemental generator of pressure having a current field-winding producing a field varying with the current in the system and a pressure field-winding producing a field proportional to the impressed pressure of the system, means for impressing the pressure due to the said pressure-generator upon the pressure-winding of the meter, and means for disconnecting the pressure-winding of the meter from the pressure-generator to cause the meter to run at a normal rate, substantially as described.

7. In a system of electrical distribution, the combination with a current-generator, of a meter having current and pressure field-windings located at a district of consumption, a supplemental generator of pressure having a current field-winding producing a field varying with the current in the system, means for impressing pressure due to the said pressure-generator upon the pressure-winding of the meter, electromagnets 22 and 23 associated with the meter, switching mechanism operated thereby for including the pressure-generator in circuit with the pressure-winding of the meter, and excluding the pressure-generator from the pressure-winding of the meter, and switching mechanism at the central station for actuating one or the other of the said electromagnets to include the pressure-winding of the meter in circuit with or exclude the pressure-winding from the circuit including the pressure-generator, substantially as described.

8. In a system of electrical distribution, the combination with a current-generator, of a meter having current and pressure field-windings located at a district of consumption, a supplemental generator of pressure having a current field-winding producing a field varying with the current in the system and a pressure field-winding producing a field proportional to the impressed pressure of the system, means for impressing the pressure due to the said pressure-generator upon the pressure-winding of the meter, electromagnets 22 and 23 associated with the meter, switching mechanism operated thereby for including the pressure-generator in circuit with the pressure-winding of the meter, and excluding the pressure-generator from the pressure-winding of the meter, and switching mechanism at the central station for actuating one or the other of the said electromagnets to include the pressure-winding of the meter in circuit with or exclude the pressure-winding from the circuit including the pressure-generator, substantially as described.

9. In a system of electrical distribution, the combination with a current-generator, of a meter having current and pressure field-windings located at a district of consumption, a supplemental generator of pressure having a current field-winding producing a field varying with the current in the system, supplemental pressure-conductors for impressing the pressure due to the said pressure-generator upon the pressure field-winding of the meter, electromagnets 22 and 23 associated with the meter, switching mechanism operated thereby for including the supplemental pressure-conductors in circuit with the pressure-winding of the meter and excluding the supplemental pressure-conductors from circuit with the pressure-winding of the meter, and switching mechanism at the central station for actuating one or the other of the said electromagnets to include the pressure-winding of the meter in circuit with or exclude the pressure-winding from the circuit including the pressure-generator, substantially as described.

10. In a system of electrical distribution, the combination with a current-generator, of a meter having current and pressure field-windings located at a district of consumption, a supplemental generator of pressure having a current field-winding producing a field varying with the current in the system, and a pressure field-winding producing a field proportional to the impressed pressure of the system, supplemental pressure-conductors for impressing the pressure due to the said pressure-generator upon the pressure-winding of the meter, electromagnets 22 and 23 associated with the meter, switching mechanism operated thereby for including the supplemental pressure-conductors in circuit with the pressure-winding of the meter and excluding the supplemental pressure-conductors from circuit with the pressure-winding of the meter, and switching mechanism at the central station for actuating one or the other of the said electromagnets to include the pressure-winding of the meter in circuit with or exclude the pressure-winding from the circuit including the pressure-generator, substantially as described.

11. In a system of electrical distribution, the combination with a current-generator, of a meter having current and pressure field-windings located at a district of consumption, a supplemental generator of pressure having a current field-winding producing a field varying with the current in the system, supplemental pressure-conductors for impressing the pressure due to the said pressure-generator upon the pressure field-winding of the meter, electromagnets 22 and 23 associated with the meter, switching mechanism operated thereby for including the supplemental pressure-conductors in circuit with the pressure-winding of the meter and excluding the supplemental pressure-conductors from circuit with the pressure-winding of the meter, switching mechanism at the central station for actuating one or the other of the said electromagnets to include the pressure-winding of the meter in circuit with or exclude the pressure-winding from the circuit including the pressure-generator, and switching means controlled at the central station for reversing the impressed pressure upon the supplemental pressure-conductors, substantially as described.

12. In a system of electrical distribution, the combination with a current-generator, of a meter having current and pressure field-windings located at a district of consumption, a supplemental generator of pressure having a current field-winding producing a field varying with the current in the system, and a pressure field-winding producing a field proportional to the impressed pressure of the system, supplemental pressure-conductors for impressing the pressure due to the said pressure-generator upon the pressure-winding of the meter, electromagnets 22 and 23 associated with the meter, switching mechanism operated thereby for including the supplemental pressure-conductors in circuit with the pressure-winding of the meter and excluding the supplemental pressure-conductors from circuit with the pressure-winding of the meter, switching mechanism at the central station for actuating one or the other of the said electromagnets to include the pressure-winding of the meter in circuit with or exclude the pressure-winding from the circuit including the pressure-generator, and switching means controlled at the central station for reversing the impressed pressure upon the supplemental pressure-conductors, substantially as described.

13. In a system of electrical distribution, the combination with a current-generator, of a meter having current and pressure field-windings located at a district of consumption, a supplemental generator of pressure having a current field-winding producing a field varying with the current in the system, and conductors for impressing the pressure due to the said pressure-generator upon the pressure-winding of the meter, substantially as described.

14. In a system of electrical distribution, the combination with a current-generator, of a meter having current and pressure field-windings located at a district of consumption, a supplemental generator of pressure having a current field-winding producing a field varying with the current in the system, and switching mechanism for causing the pressure of the supplemental pressure-generator to be impressed upon the pressure-winding of the meter to act as an additive force or to act as a counter electromotive force, substantially as described.

15. In a system of electrical distribution, the combination with a current-generator, of a meter having current and pressure field-windings located at a district of consumption, a supplemental generator of pressure having a current field-winding producing a field varying with the current in the system and a pressure field-winding producing a field proportional to the impressed pressure of the system, and switching mechanism for causing the pressure of the supplemental pressure-generator to be impressed upon the pressure-winding of the meter to act as an additive force or to act as a counter electromotive force, substantially as described.

16. In a system of electrical distribution, the combination with a current-generator supplying current to transmission-mains of the system, of a meter, a supplemental pressure-generator, supplemental pressure-conductors for connection with the pressure-winding of the meter, a circuit-changing switch for connecting the supplemental pressure-conductors with the pressure-winding of the meter, electromagnets 22 and 23 for actuating the circuit-changing switch, and switching mechanism at the central station for energizing one or the other of the said electromagnets to include the supplemental pressure-conductors in circuit with the pressure-winding of the meter, or to exclude the pressure-winding from circuit with the supplemental conductors, substantially as described.

17. In a system of electrical distribution, the combination with a current-generator supplying current to transmission-mains of the system, of a meter, a supplemental pressure-generator, supplemental pressure-conductors for connection with the pressure-winding of the meter, a circuit-changing switch for connecting the supplemental pressure-conductors with the pressure-winding of the meter, electromagnets 22 and 23 for actuating the circuit-changing switch, switching mechanism at the central station for energizing one or the other of the said electromagnets to include the supplemental conductors in circuit with the pressure-winding of the meter or exclude the pressure-winding from circuit with the supplemental conductors, and a pole-changing switch for changing the direction of the pressure impressed upon the pressure-winding of the meter from the supplemental pressure-generator, substantially as described.

18. In a system of electrical distribution, the combination with a current-generator supplying current to transmission-mains of the system, of a meter, a supplemental pressure-generator, supplemental pressure-conductors for connection with the pressure-winding of the meter, a circuit-changing switch for connecting the supplemental pressure-conductors with the pressure-winding of the meter, electromagnets 22 and 23 for actuating the circuit-changing switch, switching mechanism at the central station for energizing one or the other of the said electromagnets to include the supplemental conductors in circuit with the pressure-winding of the meter or exclude the pressure-winding from circuit with the supplemental conductors, a pole-changing switch for changing the direction of the pressure impressed upon the pressure-winding of the meter from the supplemental pressure-generator, the pressure-winding of the meter being in the form of an armature, and a commutator for connecting this armature in circuit, substantially as described.

19. In a system of electrical distribution, the combination with a current-generator, of mains receiving current therefrom, a meter receiving current from the mains and located at a district of consumption, a supplemental pressure-circuit for impressing adjusting electromotive force upon the meter, and a pole-changing switch included in the said supplemental pressure-circuit, substantially as described.

In witness whereof I hereunto subscribe my name this 3d day of June, A. D. 1901.

THOMAS DUNCAN.

Witnesses:
GEORGE L. CRAGG,
HERBERT F. OBERGFELL.